United States Patent [19]

Ashby, Jr.

[11] Patent Number: 4,783,994

[45] Date of Patent: Nov. 15, 1988

[54] PRESSURE MEASURING PROBE

[75] Inventor: George C. Ashby, Jr., Newport News, Va.

[73] Assignee: The Administrator of the National Aeronautics and Space Administration, Washington, D.C.

[21] Appl. No.: 143,436

[22] Filed: Jan. 13, 1988

[51] Int. Cl.⁴ .................. G01F 1/465; G01M 9/00
[52] U.S. Cl. .................... 73/147; 73/861.65
[58] Field of Search ............ 73/147, 861.65, 861.66, 73/861.67, 861.68, 182, 189

[56] References Cited

U.S. PATENT DOCUMENTS 2,706,408  4/1955  Holbrook .................. 73/861.68
2,986,933  6/1961  Summerlin et al. .......... 73/861.65

Primary Examiner—Donald O. Woodiel
Attorney, Agent, or Firm—Harold W. Adams; John R. Manning; Charles E. B. Glenn

[57] ABSTRACT

The invention is a probe (10) for measuring changes in pressure in a high velocity fluid streams over and adjacent the surface of an object. The probe (10) is formed of an exterior housing (11) having a closed pressure chamber (28) in which a piezo-electric pressure transducer (32) is mounted. An open connector tube (26) having a probe tip (29) passes a portion of said fluid stream into the closed pressure chamber (28), any change of pressure therein requiring a "settling-time" to appear in the closed pressure chamber (28) that is inversely proportional to the cross-sectional area of the connector tube (26). A cooling chamber (47) formed around the pressure chamber (28) is connected to a source of cooling fluid by means of inlet and outlet tubes (44) and (46), respectively.

9 Claims, 1 Drawing Sheet

U.S. Patent  Nov. 15, 1988  4,783,994
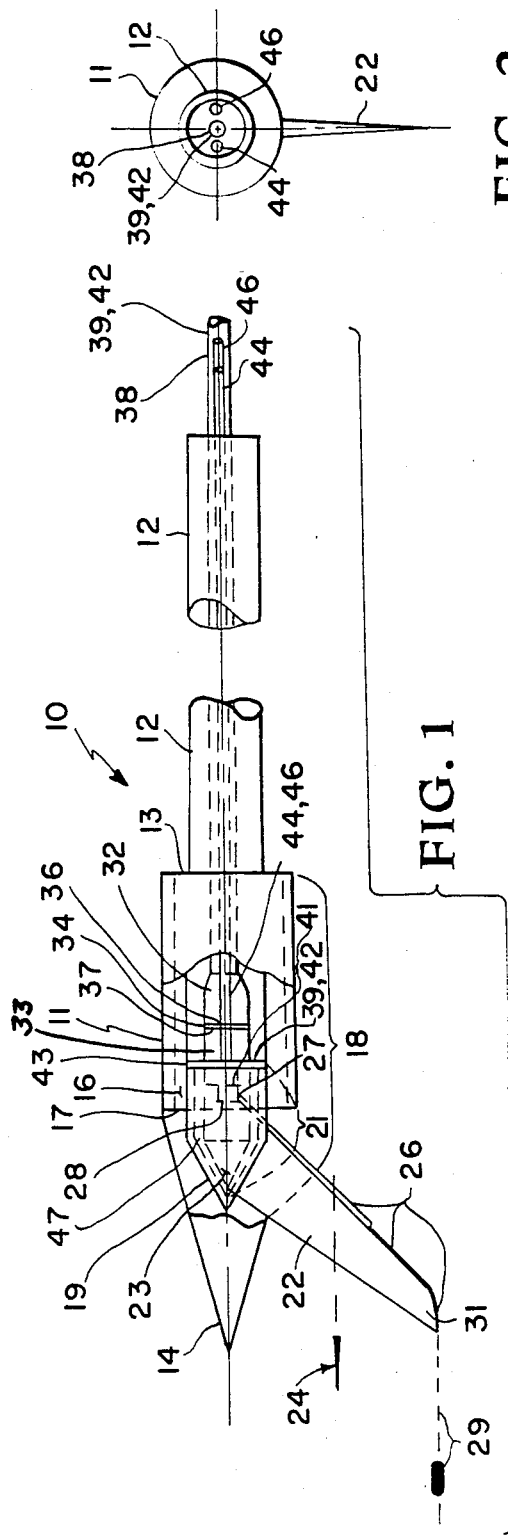
FIG. 1
FIG. 2
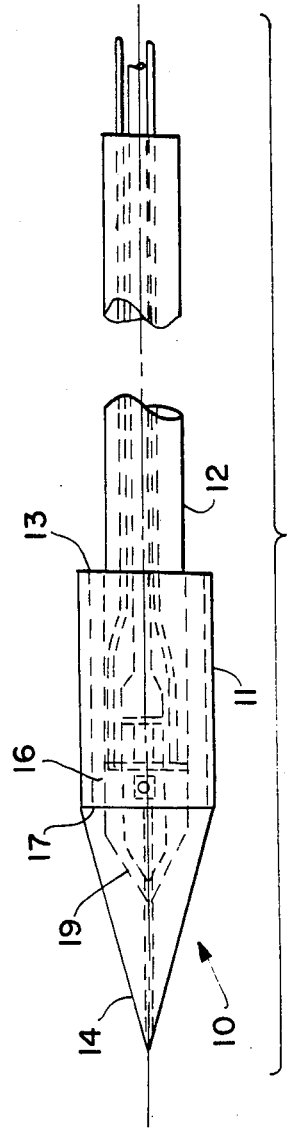
FIG. 3

4,783,994

PRESSURE MEASURING PROBE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The invention relates to pressure measuring probes and more particularly to cooled pressured probes for measuring changes in the pressure of high velocity fluid streams over the surface of an object.

2. Description of the Prior Art

Pitot-pressure probes for measuring changes in the pressure in the shock layer around a model such as a nose cone, airfoil or the like supported in super and hypersonic wind tunnels are generally known.

Typically, the hypersonic air stream is heated up to 500° F. and the transducers used to measure changes in the actual or dynamic pressure in the resulting shock layer on and about the model surface must be protected from the hostile temperatures encountered to avoid thermally induced errors in the resulting pressure measurements and possible damage to the probe and transducers.

To protect against such undesirable results, the pressure transducers are either thermally insulated and mounted in the probe housing or support strut as far removed from the probe tip as possible or completely outside of the test section. Either remote transducer positioning arrangement requires a relatively long connector tube between the probe tip and pressure transducer.

This increase in tubing volume results in an increase of "settling-time" of the pressure probe, settling time is the time required for pressure changes in the fluid stream to appear at the pressure sensing transducer. As the probe tip is frequently moved relative to the model surface to permit the measurement of changes in the pressure distribution in the shock layer on and around the model, "settling-time" is critically related to the rate of relative movement and frequency at which the measurements can be taken. This must in turn meet the operating time limits of the wind tunnel in which the measurements are made.

To meet the tunnel operating time limits by controlling the "settling-time" generally results in an increases in the size of the probe tip which leads to interference errors in pressure measurements made with such a probe. To avoid interference errors, it has been found that the probe tip should be no larger than about thirty percent (30%) of the boundary layer height in the flow around and on the test model surface. Typically the diameter of the smallest connector tubes in conventional pressure probes ranges from 0.0200d. to 0.0600d inches.

OBJECTS AND SUMMARY OF THE INVENTION

An object of the invention is to provide a probe for measuring changes in the pressure of a hypersonic fluid stream over the surface of a test model.

Another object is to provide a probe for measuring changes of pressure in a high velocity, high temperature fluid stream over a test model in which a pressure sensing transducer is mounted in the probe and connected to its tip by a short tube substantially smaller in cross-sectional area than conventional connector tube of 0.020 inches or more in diameter.

Still another object of the invention is to provide a probe for measuring pressure changes in a high velocity, high temperature fluid stream over the surface of a test model including internal means for cooling a pressure sensing transducer in said pressure measuring probe.

Yet another object of the invention is to provide a probe for measuring changes of pressure in a high velocity fluid stream including a pressure transducer means and a probe tip connected to said pressure transducer by a connector tube, the cross-sectional area of said connector tube being inversely proportional to the time required for changes of pressure in said fluid stream to appear at said pressure transducer.

The above and numerous other objects and advantages are achieved by a pressure measuring probe in accordance with a preferred embodiment of the invention which in general comprises a housing having a closed chamber therein; transducer means for measuring pressure changes in said fluid stream mounted in said closed chamber; an open connector tube including a probe tip for passing a portion of said fluid stream into said closed chamber, any change of pressure therein requiring a "settling-time" to appear in said closed chamber inversely proportional to the cross-sectional area of said connector tube; and means in said housing for cooling said transducer means.

BRIEF DESCRIPTION OF THE DRAWINGS

The above and numerous other objects and advantages will become apparent from the following detailed description of a preferred embodiment of the invention when read in light of the appended drawing wherein:

FIG. 1. is a side elevational view in partial section of a preferred embodiment of the invention;

FIG. 2. is an end view of the invention shown in FIG. 1; and

FIG. 3. is a plan view of the invention shown in FIG. 1.

BRIEF DESCRIPTION OF A PREFERRED EMBODIMENT

Referring to the drawings, FIGS. 1-3 illustrate a preferred embodiment of the invention as a fast response, miniaturized, pitot-pressure probe 10 that has been successfully used to survey the flow field about a 2:1 elliptical cone in a twenty inch (20-inch) Mach 6 hypersonic wind tunnel in which the air stream is heated up to 500° F. prior to expanding it through a nozzle to avoid liquificiation of the nitrogen and oxygen in the fluid stream.

The probe 10 is formed of an open ended stainless steel cylindrical exterior housing 11 which threadably receives a stainless steel support tube 12 of smaller diameter at one end 13 and a hollow nose cone 14 having a threaded and hollow shank 16 integrally formed thereon in its other end 17. The nose cone 14 and shank 16 are formed of a machined insulating material capable of withstanding the temperatures and pressures of fluid streams in hypersonic wind tunnels and include a straight, elongated slot 18 that opens into the interior of the nose cone and shank and extends the length of the shank 16 and into the nose cone 14.

A first smaller, hollow, and similarly bullet-shaped inner stainless steel housing 19 also provided with an elongated slot 21 is fitted over a wedge shaped brass fairing 22 which is received in the slot 21 and soldered to a second inner hollow stainless steel bullet-shaped housing 23 from which the fairing 22 angularly depends. The slot 21 is sealed with solder when this assembly is completed. The slot 18 is sealed with a sealing compound capable of withstanding hypersonic wind tunnel operating conditions after the outer and inner bullet-shaped chamber assembly is positioned in the nose cone 14 and shank 16 is threaded into the body 11.

The leading edge 24 of the depending fairing 22 is formed as a knife edge to minimize resistance to the fluid or airstream in the tunnel into which it extends. A connecting tube 26 formed of tube sections of graduated and diminishing size from the top 27 where it enters a pressure sensing chamber 28 in the second inner housing 23 to the tip 29 where it is slightly flattened and beveled, is soldered to the back or trailing edge of the fairing 22. The fairing 22 is provided with a foot 31 such that the flattened probe tip 29 of the connector tube 26 extends forward and unattached of the fairing on a line parallel to the longitudinal axis of the body 11.

A piezo-electric pressure transducer 32 supported and sealingly mounted in the pressure chamber 28 in the second inner housing 23 by means of a threaded connection between the shank 33 and inner housing, the face 34 of a shoulder 36 butting against the end 37 of the inner housing 23. An electric circuit 38 for the pressure transducer 32 which may be a Model 8530 A-50 piezo-electric transducer made by Dynamic Instrumentation Division of Endevco, 30700 Ranch Viejo Road, San Juan Capistrano, Calif. 92675, is brought out through support tube 12. A lead 39 for a temperature sensing thermocouple 41 mounted in the pressure chamber and a fouling circuit lead 42 attached to the end 37 of the inner housing 23 are also brought out through the support tube 12.

The thermocouple 41 is used to sense the temperature within the pressure chamber 28 and warn of over heating and its output is used to compensate pressure transducer output signals when the temperature of chamber 28 exceeds a determined amount as may be required. The fouling circuit 42 which is connected indirectly to the probe tip 29 is provided to signal if the probe tip 29 should contact the test model surface about which it is moved.

A flat, circular collar 43 supports inlet and outlet tubes 44 and 46 respectively for passing a cooling fluid such as water into a cooling chamber 47 formed between the second inner housing 23 and the surrounding first inner housing 19. The collar 43 containing the inlet and outlet tubes 44 and 46 slips over the leads 39 and 42 and all are brought out through the support tube 12.

In a preferred embodiment of the invention, the pressure transducer 32 may be mounted in the exterior housing 11 approximately two and one-half (2½) inches from the probe tip 29. With such a short connecting tube 26, the probe tip 29 can be greatly reduced in size or cross-sectional area compared to the elongated tube required to connect the probe tip to a remote pressure transducer as in conventional pressure probes and still have a relatively short "settling-time" well within the operating limits of the wind tunnel in which used.

For example, a 0.013-inch o.d. –0.007 i.d. probe tip 29 has been successfully used to eliminate probe interference while making flow-field surveys about an elliptical test cone in a Mach 6 wind tunnel. And it is believed even smaller off-the-shelf tubing (e.g., 0.010 o.d. or 0.008 .o.d.) can be used in accordance with the invention.

Tests have also shown that the of cooling water as in this invention reduced the temperature at the pressure transducer from about 325° F. to 103° F. which temperature is low enough to avoid the otherwise possible higher temperature thermal effects on the accuracy of pressure measurements made with the transducer 32 over a range of pressures.

While a preferred embodiment of the invention has been described in detail, numerous changes and modifications can be made within the principles of the invention which are limited only by the following claims.

What is claimed is:

1. A probe for measuring pressure changes in a high velocity, high-temperature fluid stream comprising:
    an exterior housing having a closed pressure chamber therein;
    transducer means mounted in said closed pressure chamber for measuring pressure changes in said fluid stream;
    means in said exterior housing for cooling said transducer means; and
    an open connector tube including a probe tip for passing a portion of said fluid stream into said closed pressure chamber, any change of pressure therein requiring a "settling-time" to appear in said closed chamber that is inversely proportional to the cross-sectional area of said connector tube.

2. The invention as defined in claim 1 wherein said probe is used for measuring changes of pressure in a high velocity, high-temperature fluid stream over and around the surface of an object.

3. The invention as defined in claim 1 wherein said transducer means is a pressure to current device.

4. The invention as defined in claim 1 wherein said open connector is supported upon a fairing that depends from said housing.

5. The invention as defined in claim 1 wherein said fairing includes a foot that extends substantially parallel with the longitudinal axis of said exterior housing, the tip of said connector tube being extended forwardly of said foot.

6. The invention as defined in claim 5 wherein the connector tube varies in cross-sectional area between said tip and said pressure chamber.

7. The invention as defined in claim 6 wherein said tip is other than circular in its cross-sectional configuration.

8. A probe for measuring pressure changes in a high velocity, high-temperature fluid stream comprising:
    an exterior housing;
    first and second inner housings within said exterior housing, said first inner housing forming a sealed cooling chamber around said second inner housing which forms said pressure chamber therein;
    inlet and outlet tubes for maintaining cooling fluid in said cooling chamber thereby cooling said transducer means in said pressure chamber;
    transducer means mounted in said closed pressure chamber for measuring pressure changes in said fluid stream; and
    an open connector tube including a probe tip for passing a portion of said fluid stream into said closed pressure chamber, any change of pressure therein requiring a "settling-time" to appear in said closed chamber that is inversely proportional to the cross-sectional area of said connector tube.

9. The invention as defined in claim 8 including means for sensing the temperature in said pressure chamber.

* * * * *